(12) United States Patent
Froeschle et al.

(10) Patent No.: US 7,399,026 B2
(45) Date of Patent: Jul. 15, 2008

(54) AIR GUIDING SYSTEM FOR A VEHICLE

(75) Inventors: Mathias Froeschle, Ostfildern (DE); Juergen Durm, Muehlacker (DE); Joachim Paul, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/727,611

(22) Filed: Mar. 27, 2007

(65) Prior Publication Data
US 2007/0228773 A1    Oct. 4, 2007

(30) Foreign Application Priority Data
Mar. 28, 2006   (DE) .................. 10 2006 014 263

(51) Int. Cl.
*B62D 35/00* (2006.01)
(52) U.S. Cl. .............. 296/180.5; 180/903; 296/26.12; 296/180.1
(58) Field of Classification Search ............ 296/180.1, 296/180.03, 180.05, 26.01, 26.12, 26.13, 296/180.2, 180.3, 180.4, 180.5; 180/903; 105/1.3; 244/213
See application file for complete search history.

(56) References Cited

U.S. PATENT DOCUMENTS

| | | | | |
|---|---|---|---|---|
| 1,274,986 A | * | 8/1918 | Carolin | 244/213 |
| 1,762,002 A | * | 6/1930 | De Putte | 244/213 |
| 3,791,468 A | * | 2/1974 | Bryan, Jr. | 180/69.2 |
| 4,773,692 A | * | 9/1988 | Schleicher et al. | 296/180.5 |
| 4,925,236 A | * | 5/1990 | Itoh et al. | 296/180.5 |
| 5,013,081 A | * | 5/1991 | Cronce et al. | 296/180.1 |
| 5,120,105 A | * | 6/1992 | Brin et al. | 296/180.5 |
| 5,536,062 A | * | 7/1996 | Spears | 296/180.3 |
| 6,382,708 B1 | | 5/2002 | Erdelitsch et al. | |
| 6,672,651 B1 | * | 1/2004 | Shuen | 296/180.5 |
| 2002/0074826 A1 | * | 6/2002 | Presley | 296/180.1 |
| 2007/0001482 A1 | | 1/2007 | Larson | |

FOREIGN PATENT DOCUMENTS

| | | |
|---|---|---|
| DE | 30 19 150 A1 | 11/1981 |
| DE | 43 06 090 A1 | 8/1994 |
| DE | 10 2004 030 571 A1 | 1/2006 |

(Continued)

OTHER PUBLICATIONS

European Search Report dated Jul. 5, 2007 (Seven (7) pages).

(Continued)

*Primary Examiner*—D. Glenn Dayoan
*Assistant Examiner*—Paul A Chenevert
(74) *Attorney, Agent, or Firm*—Crowell & Moring LLP (57) ABSTRACT

An air guiding system for a vehicle, particularly a passenger car, that is arranged in a rear area of the vehicle and has at least one central main air guiding element displaceable from a moved-in inoperative position into a moved-out operative position. Lateral auxiliary air guiding elements are displaceable together with the or each central main air guiding element. The lateral auxiliary air guiding elements can be rotated like a folding knife with respect to the or each central main air guiding element in order to change them from an also moved-in inoperative position into an also moved-out operative position.

11 Claims, 5 Drawing Sheets

FOREIGN PATENT DOCUMENTS

| | | |
|---|---|---|
| DE | 10 2005 030 203 A1 | 1/2007 |
| EP | 271757 A2 * | 6/1988 ............. 244/46 |
| EP | 1 118 529 A2 | 7/2001 |
| EP | 1 138 582 A2 | 10/2001 |
| EP | 1 738 996 A2 | 1/2007 |
| JP | 60163773 A * | 8/1985 ............. 296/180.5 |
| JP | 03000578 A * | 1/1991 ............. 296/180.1 |
| JP | 03281484 A * | 12/1991 ............. 296/180.1 |

OTHER PUBLICATIONS

German Office Action dated Dec. 6, 2006 (Six (6) pages) Including English translation.

* cited by examiner

Fig. 10

AIR GUIDING SYSTEM FOR A VEHICLE

RELATED APPLICATIONS

This application claims the benefit of priority under 35 U.S.C. § 119 to German Patent Application No. 10 2006 014 263 filed Mar. 28, 2006, the disclosure of which is incorporated herein by reference in its entirety.

BACKGROUND AND SUMMARY OF THE INVENTION

The present invention relates to an air guiding system for a vehicle, particularly a passenger car, which is arranged in a rear area of the vehicle and comprises at least one central main air guiding element, which can be displaced from a moved-in inoperative position into a moved-out operative position, lateral auxiliary air guiding elements being displaceable together with the or each central main air guiding element.

DE 30 19 150 A1 discloses an air guiding system that is arranged for a vehicle arranged in an upper rear area of the vehicle and has an air guiding element that can be displaced from an inoperative position, in which it is integrated in the shaping of the rear area flush with the surface, into a moved-out operative position. The air guiding element is constructed as an aerofoil which, by way of an operating device, can be displaced or changed from the inoperative position into the operative position and vice-versa.

DE 43 05 090 A1 also discloses a vehicle air guiding system arranged in a rear area of the vehicle and having an air guiding element that can be displaced from an inoperative position into a moved-out operative position. The air guiding element is formed by a rear spoiler arranged in a recessed receiving device of the vehicle body and displaced by an operating device from the inoperative position to the operative position and vice-versa.

By way of the air guiding systems disclosed in the aforementioned DE 30 19 150 A1 and DE 43 05 090 A1, the rear axle output coefficient ($c_{ah}$-value) of the motor vehicle can be increased while the drag coefficient ($c_w$-value) remains the same or is improved, these known air guiding elements each having the same transverse dimension in the inoperative position and in the operative position.

Not yet published DE 10 2005 030 203, discloses an air guiding system for a vehicle, which comprises a central main air guiding element as well as two lateral auxiliary air guiding elements. By virtue of the auxiliary air guiding elements, the transverse dimension of the air guiding system can be enlarged in the operative position and particularly the rear axle output coefficient can be further increased. The adjusting movement of the lateral auxiliary air guiding elements with respect to the central main air guiding element takes place when the main air guiding element is displaced from the inoperative position into the operative position. The adjustment of the auxiliary air guiding elements with respect to the main air guiding element therefore takes place after, and uncoupled, from the displacement of the main air guiding element.

An object of the present invention is to create a novel vehicle air guiding system in which the lateral auxiliary air guiding elements can be rotated like a folding knife with respect to the or each central main air guiding element in order to change them from an also moved-in inoperative position into an also moved-out operative position.

According to an advantageous further development of the invention, the adjustment of the lateral auxiliary air guiding elements is coupled to the displacement of the or each central main air guiding element during its change or their change from the inoperative position into the operative position and vice versa such that the lateral auxiliary air guiding elements isochronously or simultaneously with the displacement of the or each central main air guiding element with respect to the or each main air guiding element can be changed from the inoperative into the operative position or from the operative position into the inoperative position. In this case, the lateral auxiliary air guiding elements are rotated like a folding knife with respect to the or each central main air guiding element. Within a very short time and in a simple manner, the transverse dimension of the air guiding system can thereby be adapted.

Preferably, the central main air guiding element can be translatorily displaced by two telescopic operating devices from the moved-in inoperative position into a moved-out operative position and vice-versa. Each of the telescopic operating devices includes a tube fixed to the vehicle body, in which a tube is guided which is fixed to the main air guiding element. Each of the lateral auxiliary air guiding elements is disposed on the tube of a telescopic operating device fixed to the main air guiding element, and each tube fixed to the main air guiding element during its translatory movement with respect to the tube fixed to the vehicle body of the respective telescopic operating device is rotatable relative to the tube fixed to the vehicle body about its longitudinal axis, in order to rotate the auxiliary air guiding elements with respect to the main air guiding element.

Other objects, advantages and novel features of the present invention will become apparent from the following detailed description of the invention when considered in conjunction with the accompanying drawings.

DETAILED DESCRIPTION OF THE DRAWINGS

Figure 1:
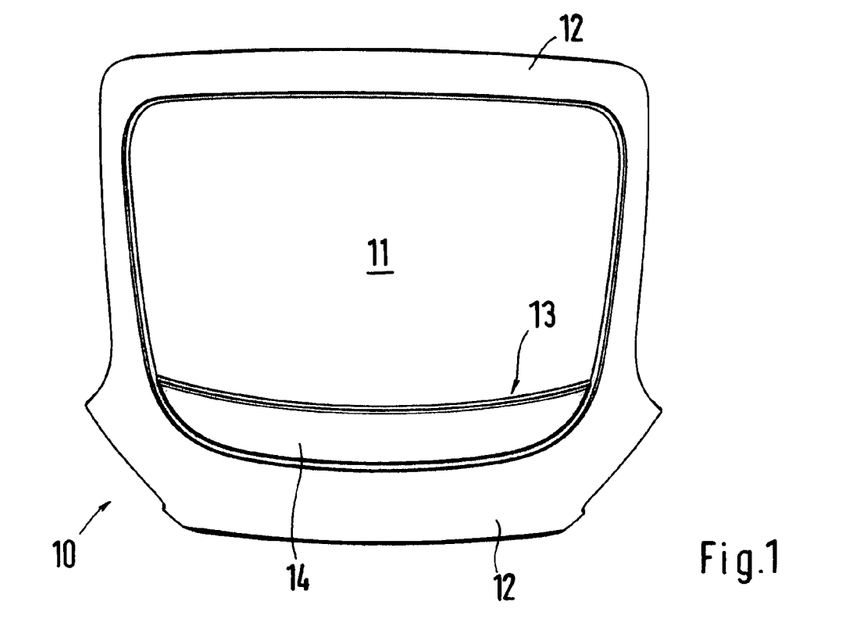
FIG. 1 is a top view of a rear area of a vehicle with an air guiding system according to the invention in the inoperative position.
Figure 2:
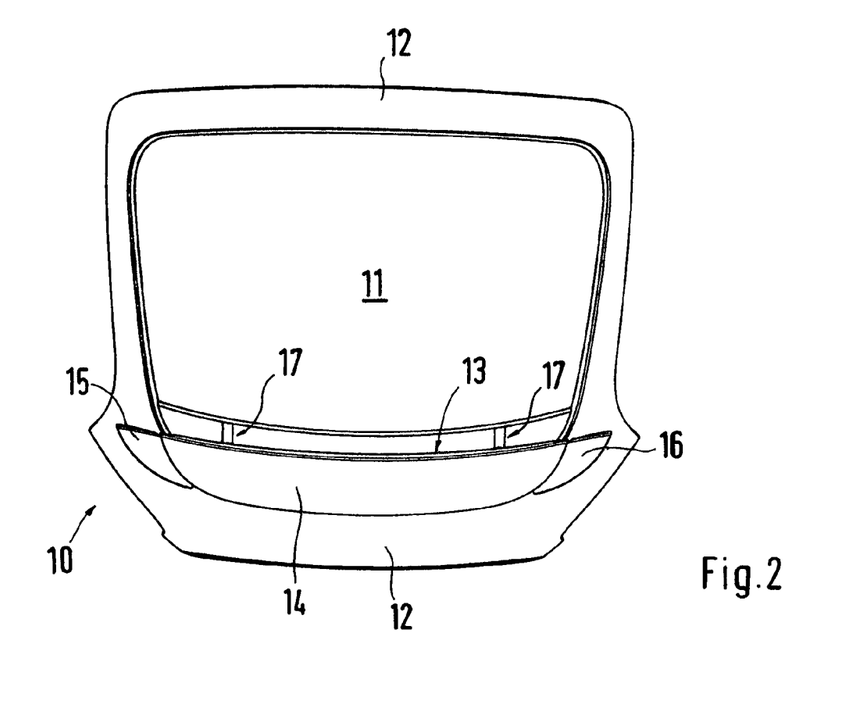
FIG. 2 is a view analogous to FIG. 1 of the rear area of FIG. 1 with the air guiding system in the operative position.
Figure 3:
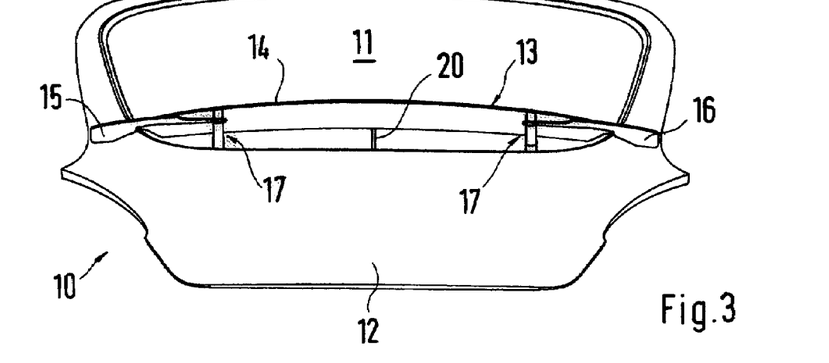
FIG. 3 is a rear view of the rear area of FIGS. 1 and 2 with the air guiding system in the operative position.
Figure 4:
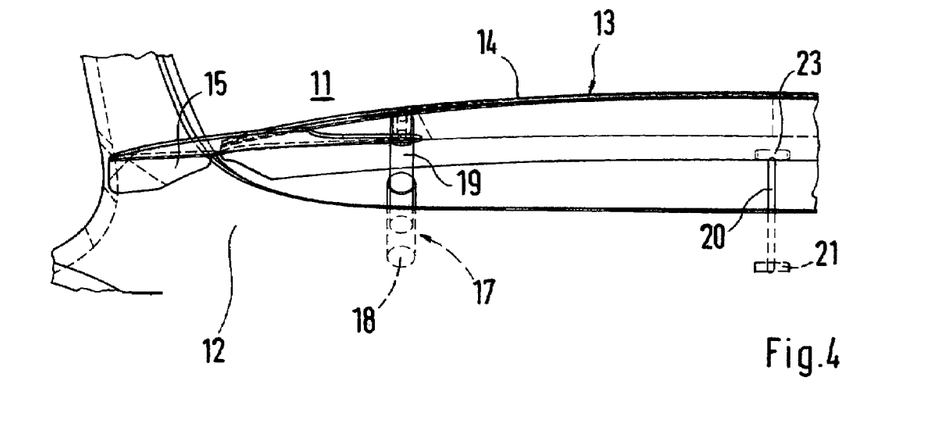
FIG. 4 is a view of an enlarged detail on the left side of FIG. 3.
Figure 5:
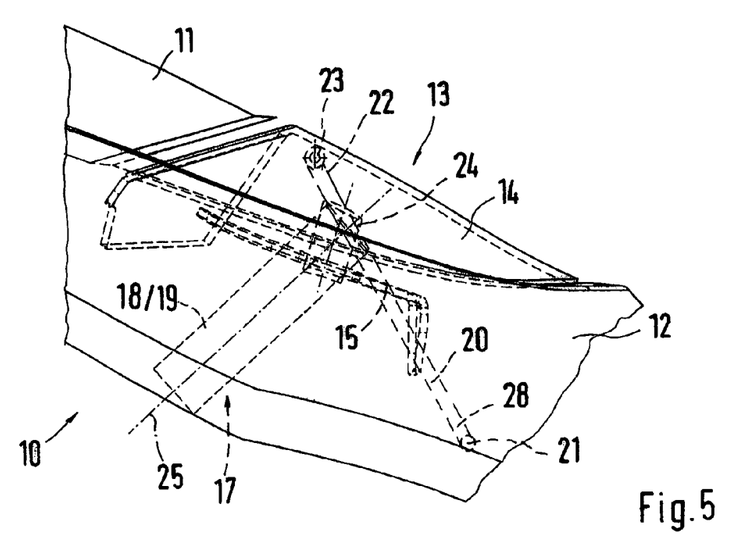
FIG. 5 is a side view of the rear area of FIGS. 1 to 4 with the air guiding system in the inoperative position.
Figure 6:
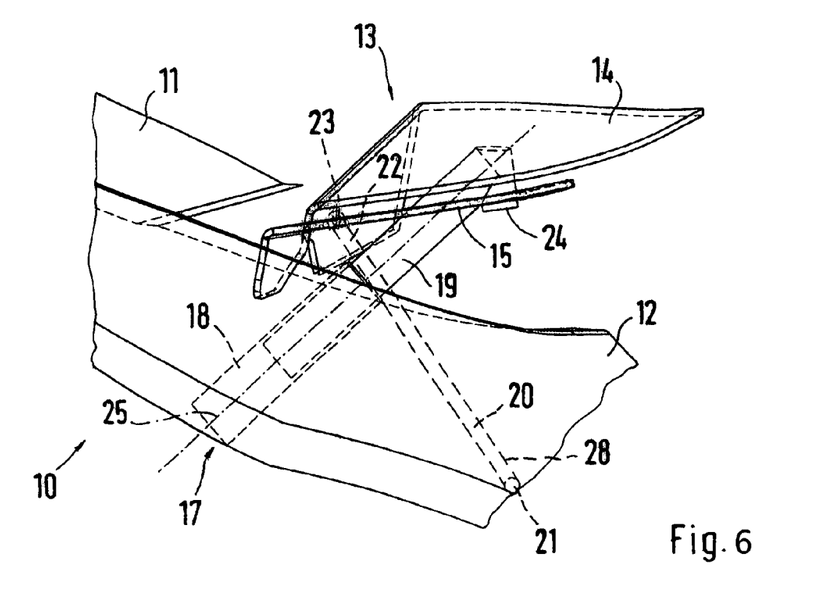
FIG. 6 is a view analogous to FIG. 5 of the rear area of FIGS. 1 to 5 with the air guiding system in the operative position.
Figure 7:
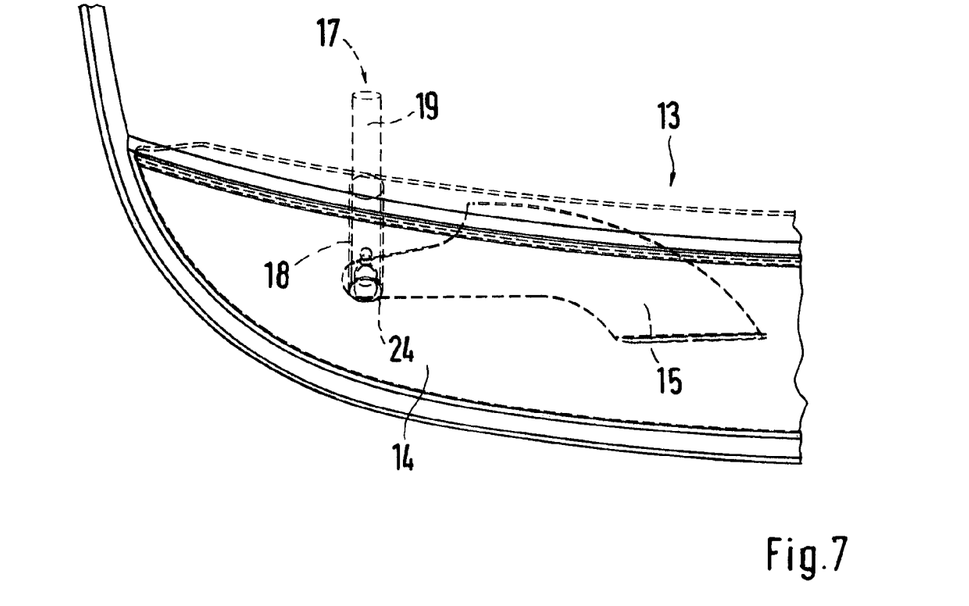
FIG. 7 is a top view of a detail of the air guiding system in the inoperative position in the area of an auxiliary air guiding element.

FIGS. 1 to 9 show different views of a vehicle body rear area 10 comprising a rear window 11 surrounded by a vehicle body part 12 in the front, the rear as well as on the sides. An air guiding system 13 is positioned in a rearward area of the vehicle body part 12 of the rear area 10 constructed in the manner of a fastback and therefore below the rear window 11. FIGS. 1, 5 and 7 show the air guiding system 13 in an inoperative position, and FIGS. 2, 3, 4, 6 and 9 showing it in an operative position.

In its inoperative position, the air guiding system 13 (see FIGS. 1, 5, 7) is integrated flush with the surface in the vehicle rear area 10. In contrast, in its operative position (see FIGS. 2, 3, 4, 6, 8, 9), the vehicle air guiding system 13 is moved out of the surface contour of the vehicle rear area 10.

In the illustrated embodiment, the air guiding system 13 according to the invention has a central main air guiding element 14 as well as two lateral auxiliary air guiding elements 15 and 16. The lateral auxiliary air guiding elements 15, 16 are visible only in the operative position (see FIGS. 2, 3, 4, 6, 8, 9) of the air guiding system 13, in which case they enlarge the transverse dimension of the air guiding system 13 or of the main air guiding element 14 in the operative position. In the inoperative position, the lateral auxiliary air guiding elements 15, 16 are covered by the central main air guiding element 14.

During the change or displacement from the inoperative position into the operative position or from the operative position into the inoperative position, the central main air guiding element 14 is lifted and lowered in the manner of an upward-directed swinging motion and thereby swiveled. The two lateral auxiliary air guiding elements 15, 16 go along in this movement of the central main air guiding element 14. The central main air guiding element 14 can be displaced by telescopic operating devices 17 (see particularly FIGS. 5 and 6) from the moved-in inoperative position into the moved-out operative position. On both sides of the main air guiding element 14, one telescopic operating device 17 respectively is applied to the main air guiding element 14.

As best illustrated in FIGS. 5 to 9, each of the telescopic operating devices 17 is formed by a tube 18 fixed to the vehicle body and by a tube 19 fixed to the main air guiding element. The tube 19 fixed to the main air guiding element is telescopically guided in the tube 18 fixed to the vehicle body such that the tube 19 can be translatorily or linearly moved with respect to the tube 18 fixed to the vehicle body. A translatory or linear movement component of the central main air guiding element 14 is thereby defined during its displacement from the inoperative position into the operative position or vice-versa from the operative position into the inoperative position.

By way of a coupling device 20, which is in each case connected in an articulated manner at a first end 28 to the vehicle body part 12 by a joint 21 and at a second end 22 with the main air guiding element 14 by a joint 23, a rotatory movement component can be superimposed on the above-described translatory or linear movement component of the main air guiding element 14, specifically about the joint 23 by way of which the coupling device 20 is applied in an articulated manner to the main air guiding element 14. In the illustrated embodiment, the coupling device 20 is constructed as a coupling guide rod or coupling rod. The coupling device 20 may also be replaced by a spring element.

When the main air guiding element 14 is changed from the inoperative position illustrated particularly in FIG. 5 into the operative position illustrated particularly in FIG. 6 by the telescopic operating devices 17, the main air guiding element 14 is translatorily moved upward. Isochronously or simultaneously the main air guiding element 14 is rotated about the pivot defined by the joint 23 of the coupling device 20. The above results in the upward directed swiveling motion of the main air guiding element 14 when the latter is changed from the inoperative position into the operative position, with the lateral auxiliary air guiding elements 15, 16 going along in this upward-directed swiveling motion of the central main air guiding element 14.

The lateral auxiliary air guiding elements 15, 16 are each disposed by way of one tube 24 respectively fixed to the auxiliary air guiding elements on a tube 19 of an adjacent telescopic operating device 17, which tube 19 is fixed to the main air guiding element 14. During the linear movement of the tubes 19 fixed to the main air guiding element 14 with respect to the tubes 18 of the telescopic operating devices 17 fixed to the vehicle body, the tubes 19 fixed to the main air guiding element can be rotated with respect to the tubes 18 fixed to the vehicle body, specifically about a longitudinal axis 25 of the tubes 18, 19. Thereby, preferably simultaneously or isochronously with the displacement of the central main air guiding element 14 initiated by the telescopic operating devices 17, the lateral auxiliary air guiding elements 15, 16 can be rotated with respect to the central main air guiding element 14 in the manner of a folding knife (see FIG. 9). The folding-knife-type rotation of the lateral auxiliary air guiding elements 15, 16 with respect to the central main air guiding element 14 is therefore mechanically coupled to the displacement of the central main air guiding element 14.

Figure 10:
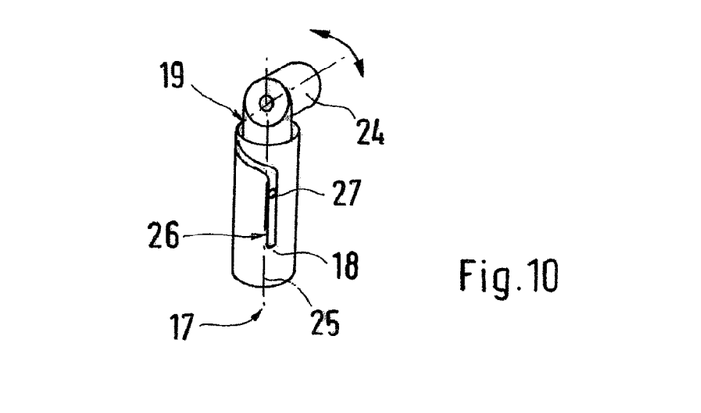
FIG. 10 is a view of a detail of the air guiding system of FIGS. 1 to 9.

The above coupling can be implemented in that, according to FIG. 10, the tube 18 fixed to the vehicle body comprises a connecting link guide 26 and the tube 19 fixed to the main air guiding element 14 comprises a pin 27 which is guided in the connecting link guide 26.

During the translatory displacement of the tube 19 fixed to the main air guiding element with respect to the tube 18 fixed to the vehicle body, the pin 27 is moved in the connecting link guide 26. The result of the contouring of the connecting link guide 26 causes a rotation of the tube 19 fixed to the main air guiding element with respect to the tube 18 fixed to the vehicle body. This rotation of the tube 19 fixed to the main air guiding element is transmitted to the auxiliary air guiding elements 15, 16 by way of the tube 24 fixed to the auxiliary air guiding elements. Thereby the auxiliary air guiding elements 15, 16 are finally rotated simultaneously or isochronously with the displacement of the central main air guiding element 14 with the respect to the latter in the manner of a folding knife.

Figure 8:
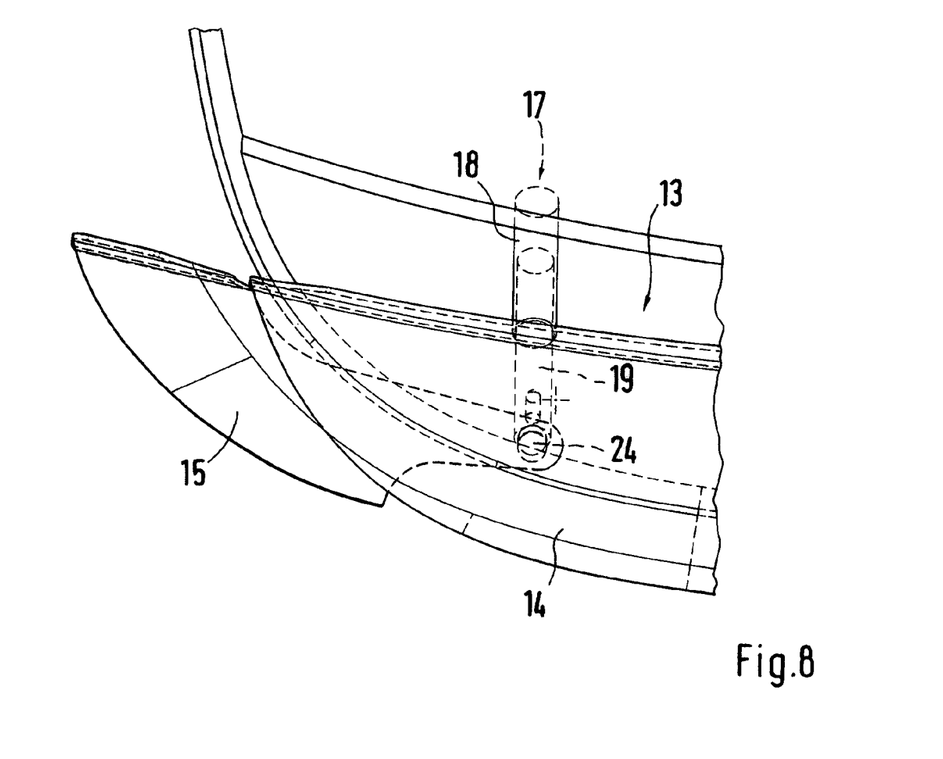
FIG. 8 is a top view of the detail of FIG. 7 with the air guiding system in the operative position.
Figure 9:
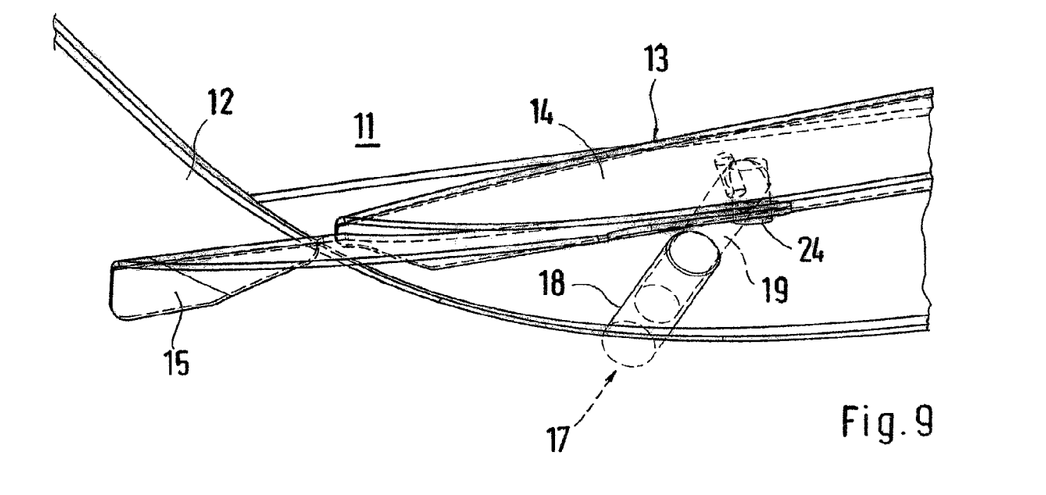
FIG. 9 is a view diagonally from the rear of the detail of FIGS. 7 and 8 with the air guiding system in the operative position.

According to FIGS. 7 and 8, the lateral auxiliary air guiding elements 15, 16 can be rotated with respect to the central main air guiding element 14 by an angle of approximately 180°. The connecting link guide 26 may be constructed such that the auxiliary air guiding elements 15, 16 are moved in a time-staggered manner with respect to the main air guiding element 14. The shape of the contouring of the connecting link guide therefore determines the time sequence of the movement of the auxiliary air guiding elements 15, 16 and the main air guiding element 14. In contrast to the embodiment illustrated in FIG. 10, however, the tube 18 fixed to the vehicle body can also comprise the pin, and the tube 19 fixed to the main air guiding element 19 can comprise the connecting link guide.

As best demonstrated by a comparison of FIGS. 5 and 6, when the air guiding system 13 is changed from the inoperative position illustrated in FIG. 5 to the operative position illustrated in FIG. 6, on one hand, the angle between the main air guiding element 14 and the tube 19 fixed to the main air guiding element will change and, on the other hand, the angle between the auxiliary air guiding elements 15, 16 and the tube 19 fixed to the main air guiding element will change. As a result, the angle between the tube 19 fixed to the main air guiding element and the tube 24 fixed to the auxiliary air guiding element will also change. For compensating this angular change, a coupling is used (not shown) and is preferably constructed between the tube 19 fixed to the main air guiding element and the tube 24 fixed to the auxiliary air guiding element. This coupling may, for example, be constructed as a known Cardan joint.

As mentioned above, in the illustrated embodiment, the folding-knife-type rotation of the lateral auxiliary air guiding elements 15, 16 with respect to the main air guiding element 14 is mechanically coupled to the displacement of the main air guiding element 14, so that only a single drive is required for adjusting the main air guiding element 14 as well as the lateral auxiliary air guiding elements 15, 16.

In contrast to the illustrated embodiment, the folding-knife-type rotation of the lateral auxiliary air guiding elements 15, 16 with respect to the central air guiding element 14 may also be mechanically uncoupled, in which case separate drives are then assigned to the lateral auxiliary air guiding elements 15, 16. The drives of the auxiliary air guiding elements 15, 16 are then preferably coupled with the drive of the telescopic operating devices 17 of the central main air guiding element 14 on the control side. In this case, the auxiliary air guiding elements can then also be moved uncoupled from the main air guiding element in order to carry out the adjusting movements of the main air guiding element and the auxiliary air guiding elements, for example, successively. Likewise, in this case, for example, speed-dependent adjustments of the auxiliary air guiding elements can be implemented, which are independent of a speed-dependent adjustment of the main air guiding element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle air guiding system arranged in a vehicle rear area, comprising at least one central main air guiding element, displaceable from a moved-in inoperative position into a moved-out operative position, and lateral auxiliary air guiding elements arranged to be displaceable together with the at least one central main air guiding element, wherein the lateral auxiliary air guiding elements are arranged to be rotatable in a folding knife-like manner with respect to the at least one central main air guiding element from an also moved-in inoperative position into an also moved-out operative position;
    wherein the lateral auxiliary air guiding elements are rotatable about an angle of approximately 180° with respect to the at least one central main air guiding element.

2. The vehicle air guiding device according to claim 1, wherein the lateral auxiliary air guiding elements are arranged to be hidden within the vehicle in the inoperative position of the at least one central main air guiding element.

3. A vehicle air guiding system arranged in a vehicle rear area, comprising at least one central main air guiding element, displaceable from a moved-in inoperative position into a moved-out operative position, and lateral auxiliary air guiding elements arranged to be displaceable together with the at least one central main air guiding element, wherein the lateral auxiliary air guiding elements are arranged to be rotatable in a folding knife-like manner with respect to the at least one central main air guiding element from an also moved-in inoperative position into an also moved-out operative position;
    wherein the lateral auxiliary air guiding elements are arranged to be changeable isochronously or simultaneously with displacement of the at least one central main air guiding element from the also moved-in inoperative position into the also moved-out operative position; and
    wherein the lateral auxiliary air guiding elements are rotatable about an angle of approximately 180° with respect to the at least one central main air guiding element.

4. A vehicle air guiding system arranged in a vehicle rear area, comprising at least one central main air guiding element, displaceable from a moved-in inoperative position into a moved-out operative position, and lateral auxiliary air guiding elements arranged to be displaceable together with the at least one central main air guiding element, wherein the lateral auxiliary air guiding elements are arranged to be rotatable in a folding knife-like manner with respect to the at least one central main air guiding element from an also moved-in inoperative position into an also moved-out operative position;
    wherein telescopic operating devices are provided for causing the at least one central main air guiding element to be translatorily or linearly displaced between the moved-in inoperative position into a moved-out operative position, each of the telescopic operating devices comprising a tube fixed to a vehicle body in which a tube fixed to the at least one central main air guiding element is operatively arranged; and
    wherein each of the lateral auxiliary air guiding elements is disposed on the tube fixed to the at least one main air guiding element.

5. The vehicle air guiding system according to claim 4, wherein each of the lateral auxiliary air guiding elements is disposed via a tube fixed to the respective lateral auxiliary air guiding element on the tube fixed to the at least one central main air guiding element, such that an angular change between the tube fixed to the respective lateral auxiliary air guiding element and the tube fixed to the at least one central main air guiding element during the change of the at least one central main air guiding element between the inoperative position into the operative position compensatable via a coupling.

6. The vehicle air guiding system according to claim 4, wherein a coupling device has one end articulatingly connected with a vehicle body part and, an opposite end, articulatingly connected with the at least one main air guiding element via joints.

7. The vehicle air guiding system according to claim 6, wherein the coupling device is configured to cause a rotary movement component about one of the joints to be superimposed on the translatory or linear movement components of the at least one main air guiding element defined by the telescopic operating devices.

8. The vehicle air guiding system according to claim 4, wherein each tube fixed to the at least one central main air guiding element, during translatory or linear movement thereof with respect to the tube fixed to the vehicle body of the respective telescopic operating device relative to the tube fixed to the vehicle body, is rotatable about a longitudinal axis thereof, and adjustment of the lateral auxiliary air guiding elements with respect to the at least one central main air guiding element is mechanically coupleable to a displacement of the at least one central main air guiding element.

9. The vehicle air guiding system according to claim 8, wherein the tube fixed to the at least one central main air guiding element has a connecting link guide operatively engaged by a pin of the tube fixed to the vehicle body.

10. The vehicle air guiding system according to claim 8, wherein the tube fixed to the vehicle body has a connecting link guide in which a pin operatively engages the tube fixed to the at least one central main air guiding element.

11. The vehicle air guiding system according to claim 10, wherein a contouring shape of the connecting link guide is configured to determine a time sequence of movement of the lateral auxiliary air guiding elements and of the at least one central main air guiding element.

* * * * *